June 5, 1951     J. C. WEAVER, JR., ET AL     2,555,866
CENTRIFUGE RECOVERY METHOD
Filed Oct. 25, 1948
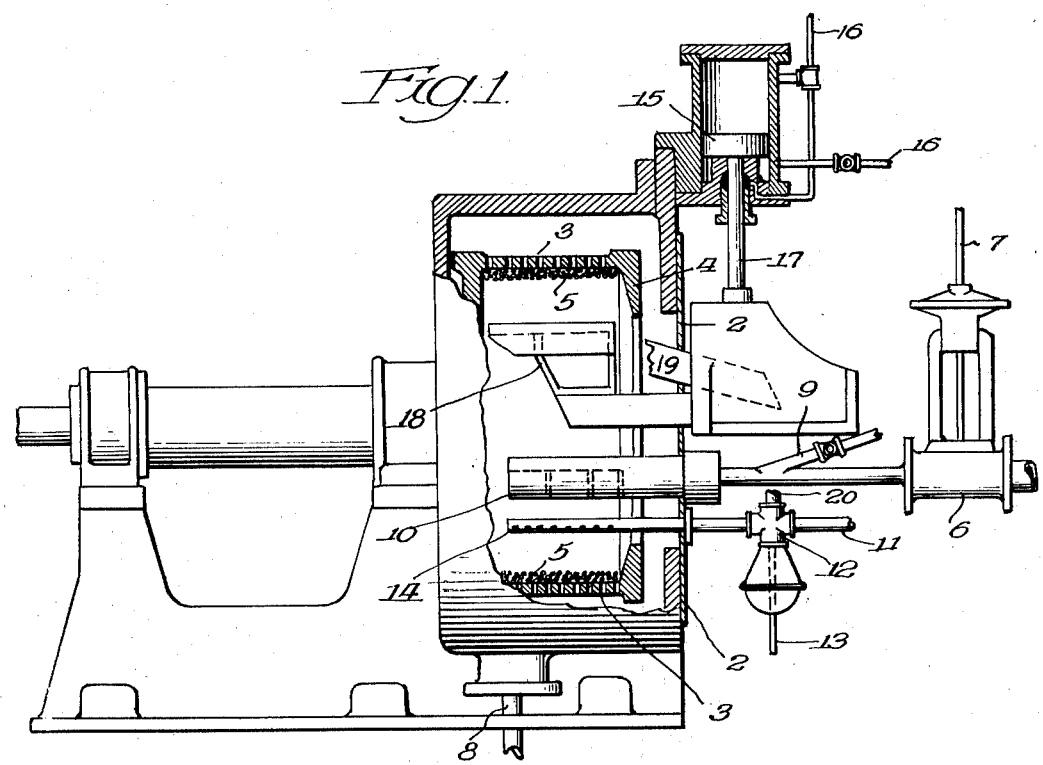
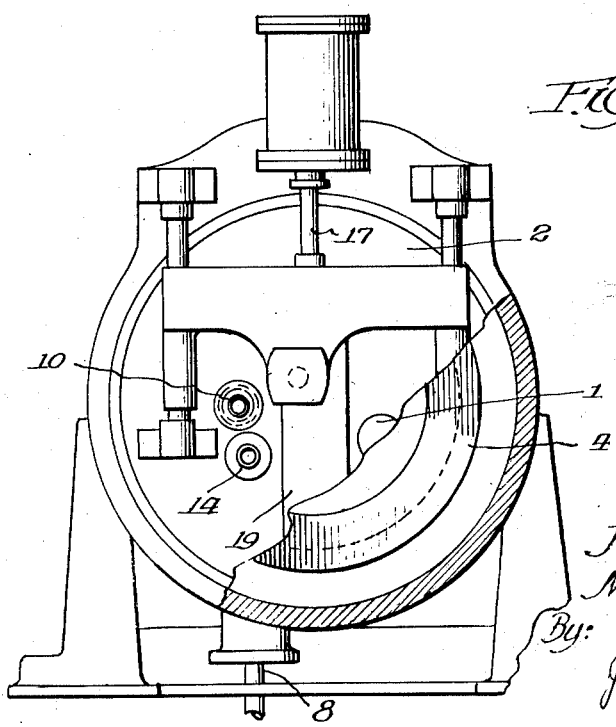
Inventor
Joe C. Weaver Jr.
Martin D. Farkas
By: Spencer, Marzall,
Johnston & Cook
Attys Patented June 5, 1951

2,555,866

UNITED STATES PATENT OFFICE 2,555,866

CENTRIFUGE RECOVERY METHOD

Joe C. Weaver, Jr., Tulsa, Okla., and Martin D. Farkas, Chicago, Ill., assignors to The Sherwin-Williams Company, Cleveland, Ohio, a corporation of Ohio Application October 25, 1948, Serial No. 56,308

4 Claims. (Cl. 210—63)

This invention relates to an improved process and apparatus for filtration and removal of suspended solid particles from a liquid suspension medium. More particularly it relates to a method and a means of eliminating the problem of plugging of the screens used in a centrifugal filtration apparatus and a processing method.

The invention is especially concerned with the recovery of crystals from a mother liquor through a centrifugal filtration operation. Heretofore, a centrifugal filtration process has not been operable in some instances due to rapid clogging or plugging of the wire cloth used as a filtration medium within the centrifuge basket. So far as is known, the prior art affords little, if any, suggestion as to means of overcoming the difficulty of clogging of centrifuge screens and thereby affording more efficient operation of centrifugal filtering operations.

As an example of the difficulties heretofore experienced, attempts to recover para-toluene sulfonic acid crystals by centrifugal filtration from the strongly acidic mother liquor in which the para isomer is least soluble were previously a failure.

The problem in the operation of the centrifuge is due to the intense packing pressures which develop during the centrifuging. The first crystals are lost through the screen until a sufficient layer is retained to function as an auxiliary filter bed. However, such a bed of crystals becomes impermeable very rapidly due to the packing and cementing of the recovered crystals under the centrifugal pressures developed and soon the filtration rate becomes impractically low.

One object of this invention is to provide a practical apparatus and method for removal of suspensions from their suspending liquor.

Another object is to provide a means of prevention of excessive lowering of the filtration rate in the centrifugal filtration of crystals from their mother liquors.

Another object of the invention is to increase the filtration efficiency of a centrifuge so that the initial losses, occurring at the beginning of each cycle of the centrifuge operation, are reduced to a minimum.

Still another object is to prevent the plugging of the filtration screen adjacent to the backing screen and interior walls of the centrifuge basket.

Another object is to provide an auxiliary filtration medium and coating on the filtration screen of the centrifuge basket, so that upon filtration of a mother liquor containing crystals the slurry must follow a tortuous path and assure a crystal free effluent.

Still another object is to provide a pre-coat material for the interior of a centrifuge, chemically inert and mechanically strong, so that the auxiliary filter bed thus formed will resist the corrosive action of liquids handled, and will withstand the compressive forces developed upon rotation of the centrifuge at extremely high rates of speed.

A more specific object is to separate crystals of para-toluene sulfonic acid from a sulfuric acid mother liquor containing the several isomers of the para-toluene sulfonic acid soluble therein, in a cyclic operation so that relatively pure crystals of the para-toluene sulfonic acid can be obtained directly from the centrifugal filtration operation with good yield and infrequent shut-downs.

Other objects and advantages of the invention will be apparent from the following description in conjunction with the accompanying drawings, in which—

Figure 1 illustrates a horizontal type continuous centrifuge with a cutaway section showing the essential elements explanatory of the disclosure.

Figure 2 is a front view of the centrifuge apparatus showing some detail of entry lines, and means of applying the pre-coat to the centrifuge basket interior walls. A cutaway section illustrates the pre-coat in position.

For purposes of illustrating the invention, both figures will be used in conjunction with an explanation of the recovery of para-toluene sulfonic acid from a sulfuric acid mother liquor. The primary concern is to illustrate the application of a pre-coat to a standard horizontal type centrifuge as available from leading manufacturers of centrifuges, and the use of the apparatus so modified. A feature of the centrifuge illustrated is a time cycle control device. This device, coupled with a system of hydraulic lines, provides for a series and sequence of operations which can be carried on within the centrifuge basket without having to stop the operation, and in the effect possessed of the capacity to carry on intermittent recovery of suspended solids automatically from a suspension liquor without the necessity of manual operations, through a cycle of removal of mother liquor, wash, dry, unloading, etc.

Inasmuch as there are similarities as well as differences between a rotary drum type filter and a centrifuge, attention should be directed to some essential differences, so that the two pieces of equipment are not loosely compared.

While both types of apparatus are useful in the general problem of separation of solids from liquids, the rotary drum filter operates under low filter pressures. Its rotational speed is seldom greater than ten revolutions per minute and its rotation is not material to filtration pressure. The solids from the slurry are generally recovered on the outside periphery of the drum, a vacuum on the interior serving to furnish the energy necessary to filtration.

In centrifugal filtration, on the other hand, tremendous filter pressures are developed due to the acceleration of gravity effected by the spinning of the centrifuge basket at very high rotational speeds. The increase in filter pressure developed due to the increased peripheral speed introduces new considerations concerned with selection and use of this class of device.

Under the influence of the increased pressures developed at angular velocities of at least two thousand revolutions per minute, there is a tremendously greater force tending to jam and compress the crystals or solids being recovered together and into the filter screen of the centrifuge basket. The filtration pressure problem is of practical insignificance, however, in a rotary drum type filter operating at near atmospheric pressures, in respect to the problem above outlined.

In accordance with the present invention, the filter screen of the centrifuge basket is precoated with a layer of inert granular material which has a larger average particle size than the material to be recovered. To form the precoat a slurry of the inert granular material is first prepared. This slurry may include carefully graded particles all within a very narrow range of mesh size, or it may include a mixture of inert granules ranging in particle size from 8 mesh to 200 mesh. The proportions and the various mesh sizes can be varied to suit the individual requirements most favorable to the particular operational problem. In the particular recovery problem herein discussed, quartz granules from about 8 to about 20 mesh were found quite satisfactory. Several different materials have been used and are illustrative of the variety which can be successfully employed as a pre-coat in a centrifuging operation. Among the materials usable are quarter-inch cubes of carbon, 200 mesh diatomaceous earth (Dicalite), graded quartz, silicon carbide, glass beads of a size range previously described for the quartz, alloy beads, etc. Other inert substances having granular characteristics offer possibilities according to the particular suspension problem being dealt with.

In this case a slurry of the selected pre-coat in water is fed through a hole 1 in the cover plate 2 while the centrifuge is in operation. Due to the centrifugal force, the particles build up a bed or coating 5 anywhere from $\frac{1}{16}$ of an inch to 1 inch in thickness depending upon the amount of slurry added upon the filter screen 3 and the mesh size of the granular substance used. After the centrifuge has been run a few minutes, a uniform filter bed will be found to have built up upon the interior walls of the centrifuge basket 4. The pre-coat is then trimmed to proper thickness by bringing the plow-blade 18 into contact therewith removing the excess of the pre-coat deposited. With the pre-coat 5 now applied, to the proper depth, a slurry of para-toluene sulfonic acid is admitted through valve 6 which is automatically controlled by a time cycle controller (not shown) which actuates the air line at 7 to control the opening and closing of valve 6. In one complete cycle of operation, the feed valve 6 is allowed to remain open for 10 seconds, feeding the slurry to the centrifuge basket 4 through distributor 10. The crystals build up on the pre-coat 5, and the mother liquor is filtered through the pre-coat 5, the screen 3, and the centrifuge basket 4, and is removed through line 8 where it may be discharged to the sewer or a part of it returned to dilute the slurry of para-toluene sulfonic acid in a storage or retainer tank.

The precoat particles, although possessed of mesh size larger than the crystals recovered, furnish a tortuous path through the interstitial spaces therebetween which trap the smaller crystals so that they are not lost in the effluent. The crystals as they are removed within and on the precoat do not jam together to form an impermeable crystal layer and through-put of liquor is not then materially reduced.

At the end of the 10 seconds of feed, the valve 6 is automatically closed, and an air purge line 9 is opened, forcing any retained slurry from the feed distributor terminus 10. The purge line, 9, aids in obtaining a high quality of crystal recovered from the operation by preventing dripping of mother liquor and resultant contamination. After 10 seconds of centrifuging during which time the mother liquid has been removed from the crystals separated on the surface of the pre-coat 5, a wash cycle of two seconds is activated by the time cycle control, and cold water is admitted through line 11, and valve 12, controlled by the activating airline 13. The cold wash water is sprayed from the terminus of the wash line 14 through spray nozzles mounted thereon. The washing cycle removes the impurities from the crystals deposited within the centrifuge basket. The wash water is shut off at the end of the two second wash cycle by actuating control line 13, and a fifty second drying cycle follows, during which time the uniform operating speed of the centrifuge of 2000 revolutions per minute is maintained.

The centrifugal force forces retained liquid from the crystals and dries them. At the end of the fifty second drying period, the hydraulic piston at 15 is actuated by means of the time cycle controller and air line 16. The piston 17 causes the plough blade 18 to be elevated into the bed of crystals formed on the surface of the pre-coat 5. As the plough blade comes in contact with the crystals at the high operating rate of the centrifuge, the crystals are forced from the interior of the centrifuge through the product delivery chute 19, into a suitable receiving vessel. The unloading requires three seconds time.

The plough blade 18 is returned to its original position by means of the time cycle controller and the hydraulic piston at 15. Hot water is then admitted through line 20 and valve 12 for a controlled time period of five seconds. During this phase of the cycle hot water beats against the retained crystals on and within the pre-coat, dissolves the crystals of para-toluene sulfonic acid remaining and the hot solution is removed through line 8 to a reservoir and later used as solvent for the para-toluene sulfonic acid crystals discharged from the centrifuge.

At the end of the hot water rinse, the pre-coat 5 is in a rejuvenated condition ready for a repetition of the cycle just described. There is, of course, a wide latitude in the choice of the time for each phase in the cycle, and it is obvious that the time of each phase within the cycle can be varied to suit the character of the material handled and the quality of the product made.

From the above descriptions of the operation of the continuous centrifuge employing a pre-coat, it can be seen that a wide variety of granular materials can be used to pre-coat a centrifuge prior to the actual filtration operation. It is obvious that some selectivity in granular material can be practiced depending on the process, although we believe that granular quartz will prove applicable to a wide variety of processes. There is no need to discuss in detail the various operations of the feed lines or the automatic controls which operate the equipment within a predetermined time cycle as this information is relevant to and varies with the specific recovery problem. While the filtration and recovery of para-toluene sulfonic acid has been used to illustrate the application and use of a pre-coat in a continuous centrifuging operation, the disclosure is not limited to the illustration, and it is obvious that the pre-coating of a centrifuge can be adapted to the recovery of other suspended material from its suspending liquid. For example, in some cases the crystalline material recovered upon the pre-coat will be found to be insoluble in hot water, and it may also be found that a liquid other than water may be desirable for the washing phase of the cycle. In such cases, it may be found desirable to wash the crystals with a poor solvent in which the crystals are insoluble, followed by later removal of the compacted crystals on the surface of the pre-coat by dissolving said crystals from the pre-coat with a solvent therefor, in much the same fashion as hot water was used in the above description to remove the hot water soluble para-toluene sulfonic acid from the pre-coat layer.

From time to time it may be expedient to replace the pre-coat formed upon the interior walls of the centrifuge basket and this can be best done by removal of the cover plate and the auxiliary equipment passing therethrough to allow ready access. A manual removal of the deteriorated pre-coat can then be effected. Removal of a used pre-coat and the application of a new one may be periodically expedient, particularly if the granular material selected is of a frangible nature, and is broken down by the centrifugal force of one granule against another, and the abrasive action upon unloading contact of the plough blade and the transfer of the force thereof to the pre-coat during the said unloading phase.

Heretofore, it has been a general practice in the removal of materials in suspension difficult to separate from their suspending liquids to add thereto an auxiliary material or filter aid. In general, materials such as diatomaceous earth have been most acceptable in this practice. It is to be noted that the present invention does not use filter aid in the sense that the term is employed in reference to the above described practice of adding a third material to the liquid suspension or slurry to be filtered. The general practice of adding a filter aid has a number of objections which include high losses in the initial starting of the centrifugal filtering operation and contamination of the recovered solids with the filter aid. The latter contamination necessitates a further separating operation in order to recover the purified material from the filter aid, and is, therefore, objectionable. Another objection to filter aids is, despite their use, an eventual plugging of the centrifuge screen occurs before all of the mother liquor has been separated from the filtered crystals.

The use of an auxiliary filtration medium is particularly adapted in the recovery of fine crystals, because the tortuous path assures more complete recovery as evidenced by a clearer effluent. Ordinarily, when starting on fresh screen, the mesh size of screen must be less than the size of the crystals recovered. With a pre-coat as an auxiliary filtration bed, the screen mesh size can be larger, as well as the granules composing the said bed. With the larger screen mesh and larger granules composing the pre-coat bed, the pressure drop is consequently less.

While the thickness of the pre-coat layer may be varied from $\frac{1}{16}$ of an inch to 1 inch, more or less, experience thus far shows that a thickness of from $\frac{1}{8}$ of an inch to $\frac{1}{2}$ of an inch has been practical.

The size of the mesh of the inert granular material will vary somewhat according to the particle size and the nature of the material to be separated from the liquid suspension.

The term "insert" is herein used to signify that the material composing the granules of the pre-coat to be inert to the action of the mother liquor, or the suspending liquid from which the solids are to be separated.

There are many chemical manufacturing processes, particularly in the recovery of crystals resulting from the synthesis or organic compounds, wherein the present invention may open a practical method of recovery of crystals by centrifugal filtration, heretofore impractical because of problems of impermeability developed on the centrifuge screens.

The invention is hereby claimed as follows:

1. An improved process for the recovery of crystals from a suspending liquor by centrifugal filtration wherein the crystals in suspension are of such character that the apparatus becomes inefficiently operative due to the plugging of the centrifuge basket by the said crystals, the process comprising the following operations in sequence: pre-coating the filter screen of the centrifuge with auxiliary filter bed of inert granules having a particle size from between 8 to 200 mesh, admitting the slurry of crystals in their suspension liquids, centrifuging the suspension liquid from the crystals, spray-washing the recovered crystals with a poor solvent therefor, centrifuging from the crystals the excess washing medium, removing and recovering the washed and dried crystals from the pre-coat, restoring the pre-coat to its original condition by washing the retained crystals therefrom by means of a solvent for the said retained crystals, and removing the said solvent from the pre-coat while continuously rotating the centrifuge basket.

2. An improved process for the recovery of para-toluene sulfonic acid from a suspension of its crystals in a mother liquor, which comprises the steps of forming an auxiliary filter bed of inert granules from 8 to 200 mesh in size on the filter screen of a centrifuge, admitting a slurry of para-toluene sulfonic acid crystals and its mother liquor, centrifuging the mother liquor from the para-toluene sulfonic acid crystals, spray-washing the recovered crystals with water, centrifuging the excess washing medium from the recovered crystals, removing and recovering the bulk of the said crystals from the surface of the pre-coat, and restoring the pre-coat to its original condition by removing the residual para-toluene sulfonic acid crystals therefrom by washing the pre-coat with hot water.

3. An improved process for the recovery of crystals from a suspending liquor by centrifugal filtration wherein the crystals in suspension are of such character that the apparatus becomes inefficiently operative due to the plugging of the centrifuge basket by the said crystals, which comprises precoating the filter screen of the centrifuge basket interiorally with an auxiliary filter bed of inert graded granules, admitting the slurry of crystals in their suspension liquor interiorly of the centrifuge basket, centrifuging the suspension liquor from said crystals, removing the centrifuged crystals from the pre-coat, restoring the pre-coat to its original condition by washing the retained crystals therefrom by means of a solvent for said retained crystals, and removing the said solvent from the pre-coat, all while continously rotating the centrifuge basket.

4. An improved process for the recovery of crystals from a suspending liquor by centrifugal filtration wherein the crystals in suspension are of such character that the apparatus becomes inefficiently operative due to the plugging of the centrifuge basket by the said crystals, the process comprising the following operations in sequence: pre-coating the filter screen of the centrifuge with an auxiliary filter bed of inert graded granules, admitting the slurry of crystals in their suspension liquor, centrifuging the suspension liquid from said crystals, washing the recovered crystals with a poor solvent therefor, centrifuging from the crystals the excess washing medium, removing and recovering the washed and centrifuged crystals from the pre-coat, restoring the pre-coat to its original condition by washing the retained crystals therefrom by means of a solvent for the said retained crystals, and removing the said solvent from the pre-coat, all while continuously rotating the centrifuge basket.

JOE C. WEAVER, Jr.
MARTIN D. FARKAS.

REFERENCES CITED

The following references are of record in the file of this patent:

UNITED STATES PATENTS

| Number | Name | Date |
| --- | --- | --- |
| 1,160,052 | Dibbets | Nov. 9, 1915 |
| 1,165,567 | Brown | Dec. 28, 1915 |
| 2,102,780 | Bielfeldt | Dec. 21, 1937 |

FOREIGN PATENTS

| Number | Country | Date |
| --- | --- | --- |
| 7,491 | Great Britain | of 1896 |